March 15, 1966  M. EPHRAIM, JR., ETAL  3,240,193
PISTON AND PISTON COOLING MEANS
Filed July 30, 1964  3 Sheets-Sheet 2

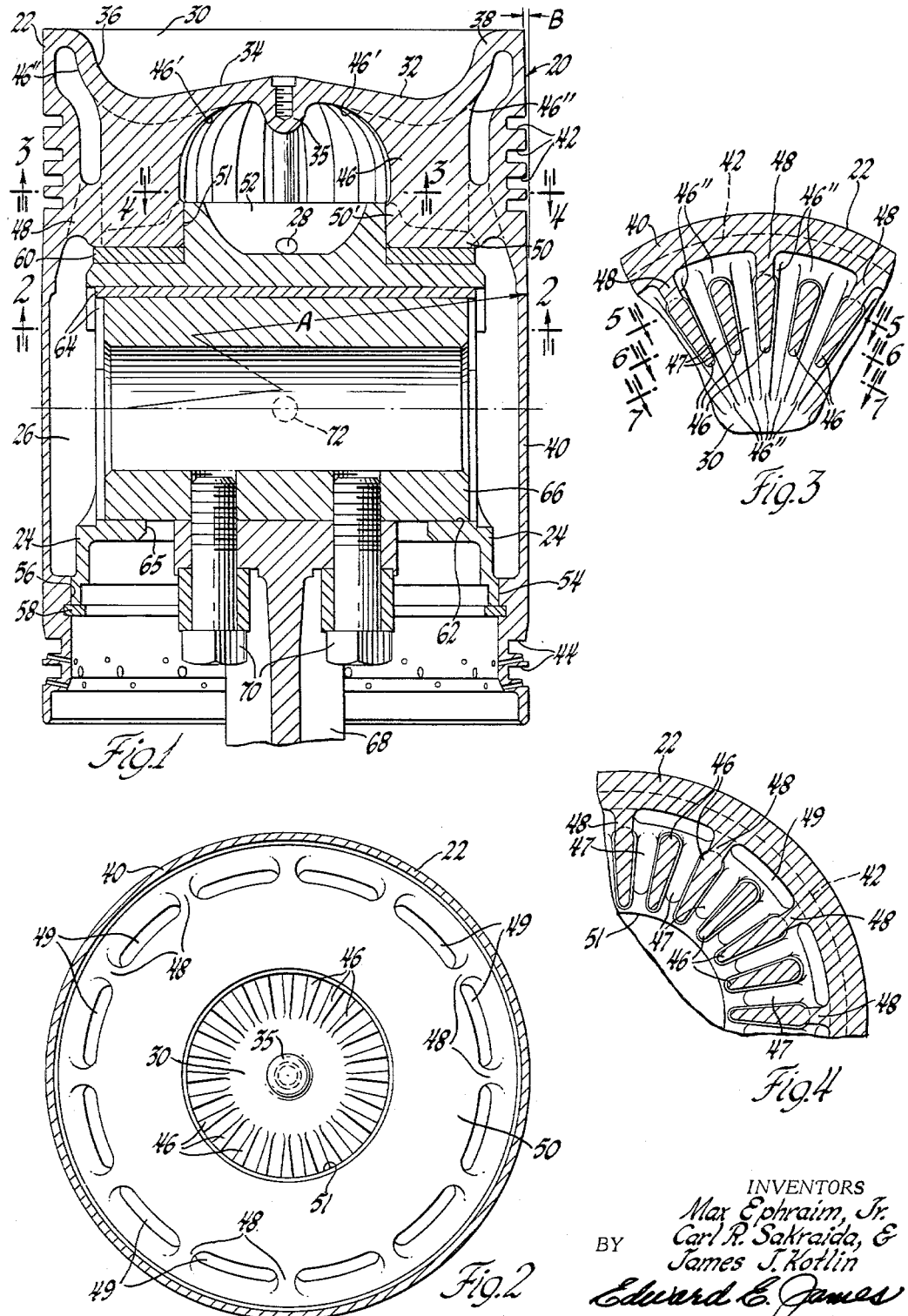

INVENTORS
Max Ephraim, Jr.
Carl R. Sakraida &
BY James J. Kotlin
Edward E. James
ATTORNEY

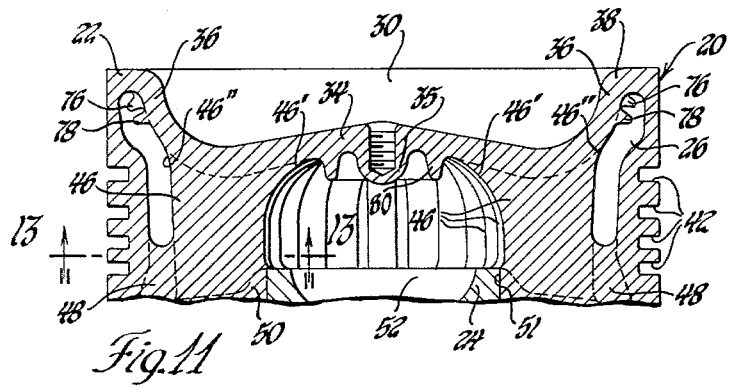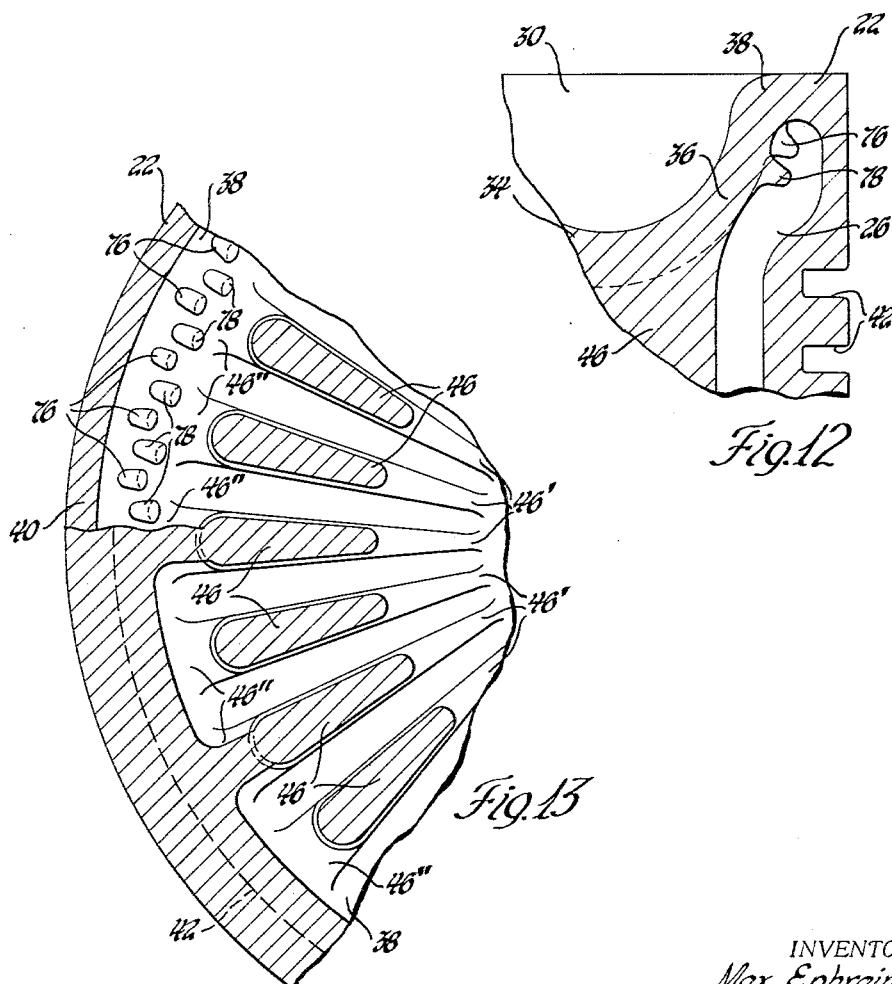

United States Patent Office 3,240,193
Patented Mar. 15, 1966

3,240,193
PISTON AND PISTON COOLING MEANS
Max Ephraim, Jr., Chicago, and Carl R. Sakraida and
James J. Kotlin, Downers Grove, Ill., assignors to General Motors Corporation, Detroit, Mich., a corporation of Delaware
Filed July 30, 1964, Ser. No. 386,210
20 Claims. (Cl. 123—41.35)

This invention relates to an internal combusion engine; more particularly to a piston for such an engine; and with regard to certain specific aspects, to a piston for a two-cycle engine having a toroidal bowl closing one end and partially forming an open semi-turbulent combustion chamber.

The head or crown of an internal combustion engine piston must necessarily be designed to withstand extreme cyclic thrust and thermal load conditions. Such load conditions are imposed by the repetitive explosive combustions which occur within the expansible combustion chamber partially defined by the reciprocating piston. The piston should be as light as possible, however, consistent with operational durability to limit the reciprocating mass of the piston and thereby the inertial loads reversals imposed by the piston on the several associated engine components.

In certain high compression, high output engines, it is often necessary to supplement normal conductive cooling of the piston. Additional piston cooling is often accomplished by spraying or splashing cooling oil on the underside of the piston crown with consequential heat transfer to the oil. Such oil cooling of the piston is usually necessary in relatively high-speed two-cycle engines wherein the combusion generated power impulses and required heat transfers occur at twice the frequency of a four-cycle engine operating at the same speed.

Where insufficient cooling is provided, various types of piston failures may occur. Such failures include destructive burning and cracking of the piston crown, radial cracking of piston rims forming recessed combustion chambers, piston seizures, and cracking of the interior piston structure. Insufficient and uneven piston cooling may also result in thermal mushrooming and ovalizing of the piston head, piston ring clamping seizures, and insufficient lubrication of the cylinder walls with resultant scuffing of the pistons, piston rings and cylinders. Continued engine operation under such adverse conditions often causes excessive wear or results in the destruction of associated engine parts. Servicing and replacing such engines components is both costly and time consuming.

The cyclic thrust loads and thermal operating conditions normally imposed on an engine piston are necessarily aggravated in turbocharging or otherwise upgrading existing high speed, high compression engines. Similar problems occur in designing new more compact, lightweight engines capable of meeting the ever increasing demands for more power in engines mountable for service replacement in existing mobile and stationary installations.

The invention contemplates an improved piston construction having a relatively light head or crown portion reinforced by a plurality of closely spaced, arch forming radial struts capable of optimum thrust load transmission and cooperative with cooling oil supplied to the interior of the piston to assure adequate equalized cooling of the piston crown, of a cored combustion chamber defining rim, and of a rim adjacent ring mounting portion of the piston skirt. With regard to certain of its more specific aspects, the invention further contemplates an improved two-piece piston structure of the type disclosed in United States Patent No. 3,053,595 issued to William G. Dilworth and entitled "Variable Curvature Wrist Pin Bearing."

The foregoing and other objects, advantages and features of the invention will be apparent and more throughly understood from the following description of several illustrative embodiments, having reference to the accompanying drawings, in which:

FIGURE 1 is a sectional view of a two-piece piston embodying the invention and including an outer piston member rotatably mounted on a thrust load transmitting carrier;

FIGURE 2 is a transverse sectional view of the outer piston member and is taken in the direction of the arrows and substantially in the plane indicated at 2—2 of FIGURE 1;

FIGURES 3 and 4 are fragmentary sectional views taken in opposite directions and in the planes indicated by the arrows and the lines appearing at 3—3 and 4—4 of FIGURE 1 and show the head and thrust collar supporting radial struts of the illustrative piston in transverse section;

FIGURE 11 is a fragmentary sectional view similar to the upper portion of FIGURE 1 and shows a second modification of the piston crown structure;

FIGURE 12 is an enlarged fragmentary sectional view corresponding to and further illustrating the rim portion of the modified piston shown in FIGURE 11; and FIGURE 13 is an enlarged fragmentary sectional view taken substantially in the plane indicated at 13—13 of FIGURE 12 with certain portions removed to illustrate the internally spined rim of this modified piston.

Figure 5:
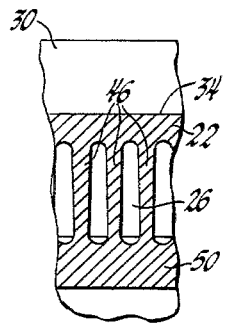
FIGURES 5, 6 and 7 are fragmentary radially spaced sectional views taken through the outer piston member and longitudinally of the several head supporting struts substantially as indicated at 5—5, 6—6 and 7—7 of FIGURE 3.

Referring more particularly to the drawings, the piston and connecting rod assembly illustrated in FIGURE 1 includes a two-piece piston 20 particularly adapted for use in a turbocharged two-cycle internal combustion engine of the compression ignition type. The piston 20 includes a substantially hollow outer piston member 22. The outer member is rotatably supported on an inner piston carrier 24. The carrier is in turn pivotally connected by a trunnion pin 66 to the upper end of a connecting rod 68. The two piston members 22 and 24 form a chamber 26 therebetween which is normally supplied with piston cooling oil through a passage partially shown at 28. This passage extends obliquely outwardly and downwardly through the carrier. In an assembled engine, the lower end of this passage is aligned to receive a jet of pressurized cooling oil emanating through a suitable nozzle or orifice mounted on a conventional oil distribution manifold, not shown, extending longitudinally of the engine crankcase.

The outer piston member 22 is closed at its upper end to form a crown or head portion 30. A cylindrical skirt portion 40 extends longitudinally from this closed end portion. The head of the illustrative piston is recessed to form an open semi-turbulent toroidal combustion chamber bowl 32. This bowl has a shallow conical bottom wall 34 which extends radially outwardly from a depending central boss 35. The boss 35 has a bore opening to the recessed head of the piston and is tapped as shown for threadable engagement with a suitable piston pulling tool. The curved side wall 36 of the combustion chamber bowl is formed by coaxial revolution of two arcs tangential to the spaced surfaces of the conical bottom wall 34. The upper periphery of the bowl side wall is curved or flared outwardly and connected by an annular wall portion 38 to the radially spaced upper end of the piston skirt 40. The wall portion 38 thus cooperates with the concentric upper ends of the bowl and skirt to form a peripheral rim on the piston.

In casting the piston member 22, the rim portion of the mold assembly is internally cored so that the rim portion 38 of the finished piston is annularly recessed as shown. A hollow thin-wall rim is thus provided having substantial internal surface and tending to assure adequate heat transferring contact with the cooling oil supplied to and agitated within the piston and carrier formed chamber 26. This oil cooling of the piston rim normally reduces conductive heat transfer to and through the thin wall of the rim and thus limits thermal expansion and distortion of the rim and of the adjacent upper portions of the piston skirt.

The wall of the piston skirt 40 is increased in radial thickness in spaced relation below the rim 38. This thicker skirt portion is circumferentially grooved at 42 to mount a spaced plurality of compression and combustion pressure sealing rings, not shown. The lower portion of the piston skirt is similarly increased in radial wall thickness and grooved at 44. These lower grooves are adapted to mount several oil control rings, not shown, in spaced relation to the lower end of the piston skirt. This grooved lower portion of the piston skirt is preferably recessed and perforated as shown to facilitate the oil controlling action of the oil rings mounted in these lower grooves.

The piston skirt is finished above the lower oil ring grooves to form a cylindrical outer surface of constant radius extending upwardly through approximately the lower half of the piston. Above a transverse median plane approximately bisecting the length of the piston and including the pivotal axis of the carrier mounted trunnion pin 66, the piston skirt is tapered on a substantial radius A about a point located in the bisecting plane remotely from the piston. This arcuately tapered surface is tangential to the lower cylindrical surface of the piston skirt and is terminated upwardly by its intersection with the lower compression ring mounting groove 42. Above this lower groove, the upper end of the piston skirt is provided with a straight-line conical taper indicated by the angle B. This upper conically tapered surface is preferably formed tangentially of the arcuately tapered intermediate surface portion of the skirt.

As shown in FIGURES 1, 2 and 4–7, the interior structure of the outer piston member includes an annular collar 50. This collar is supported longitudinally and coaxially of the piston head 30 and extends normally of the common longitudinal axis of the piston and carrier. The collar 50 is spaced slightly below the lower compression ring mounting groove and is concentrically embraced by the adjacent thicker wall portion of the skirt. The central opening through the collar is finished to form a cylindrical bearing surface 51. This bearing surface may be extended upwardly by a short upstanding annular flange 50'. The radially extending undersurface of the piston collar is also finished to form an annular thrust bearing surface. The collar 50 thus forms the primary thrust load transmitting deck or member within the piston.

The upper end of the piston carrier has a reduced diameter cylindrical boss 52 of relatively short axial dimension and finished radially to form a stub journal. This stub journal boss is insertable coaxially within the cylindrical bearing surface of the collar 50 and rotatably supports the upper end of the carrier. The annular shoulder formed on the carrier by the journal boss 52 is finished to form a radially extending thrust bearing surface opposing the thrust bearing undersurface of piston collar. In the illustrative carrier, the stub journal forming boss 52 is centrally recessed as shown to form a shallow oil receiving cup opposing the conical bottom wall and depending central boss of the piston head. This cup is intersected by the oil supply passage 28.

A cylindrical flange forming the lower end of the piston carrier 24 is circumferentially finished at 54 to form a journal bearing surface. This bearing end flange of the carrier is rotatably engageable with a mating bearing surface 56 finished internally of the thick lower wall portion of the piston skirt above the several oil mounting grooves. In assembly, a carrier retaining snap ring 58 is inserted in an annular groove opening inwardly of the lower piston skirt portion. This retaining ring rotatably engages the bottom end surface of the carrier end flange or skirt and normally maintains the upper thrust bearing shoulder of the carrier in rotative engagement with an annular thrust bearing washer 25. This thrust bearing slidably embraces the collar journaled boss 52 and is normally maintained in rotative engagement with the thrust bearing undersurface of the piston load deck or collar 50.

The carrier 24 has a trunnion or wrist pin mounting bore 62 extending diametrically therethrough intermediate its ends. In the illustrative carrier, the upper pin engaging portion of this bore is lined by a partial bearing insert 64. This bearing insert is removably mounted for service replacement in a bore facing relief and is preferably finished with the coextensive bearing surfaces formed by the remainder of the diametrical bore through the carrier. The lower portion of the pin mounting bore is intersected by an arcuate opening 65 facing downwardly toward the concentric open ends of the carrier and piston members. In assembly, a hollow trunnion-type wrist pin or journal bearing 66 is slidably inserted within the carrier defined bore 62 in radial engagement with the bearing insert. This wrist pin or journal bearing is then suitably secured by two laterally spaced bolts 70 as shown to the arcuately flanged upper end of a connecting rod 68. This flanged end of the connecting rod extends upwardly through the arcuate opening of the carrier. The journal bearing or pin 66 is thus adapted to transmit primary piston reciprocating thrust loads to and from the piston and carrier through a lubrication film normally interposed between the pin and the bearing insert 64. The pin is thus oscillated through a limited sector together with the connecting rod 68. The distal lower end of this rod is suitably journaled at its opposite end on an engine driven crankshaft, not shown.

In accordance with the invention, the thrust collar 50 is structurally connected to the bowl forming portions of the piston head 30 by a plurality of equiangularly and closely spaced wedge-shaped radial struts or columns 46. These structural columns are formed integrally of the piston head and collar and extend longitudinally therebetween. The struts 46 are spaced radially inwardly of the upper ring belt of the piston skirt and serve as the primary heat transferring and thrust load transmitting members between the piston head and thrust collar. A second plurality of integrally formed struts 48 extend radially outwardly and connect the lower end portions of every other longitudinal strut 46 and the annular thrust collar of the piston to the lower portion of the adjacent ring mounting belt of the piston skirt. These radially extending struts thus serve to provide substantial side thrust structural rigidity between the thrust collar and the adjacent relatively thick ring mounting wall or belt of the skirt.

As shown in FIGURES 3 and 4, the longitudinal struts 46 have radially inclined side walls and are preferably rounded inwardly and outwardly of the piston. These angularly spaced struts are thus tapered in thickness inwardly of the piston. As further shown in FIGURES 5, 6 and 7, the struts 46 are also slightly tapered longitudinally or downwardly from the piston head. The closely spaced adjacent struts thus cooperate to form relatively narrow radial passages 47 extending therebetween. In the illustrative piston, the angular width of these several strut defined passages is substantially equal to the cross-sectional width of the adjacent struts taken at corresponding radii about the axis of the piston.

Figure 6:
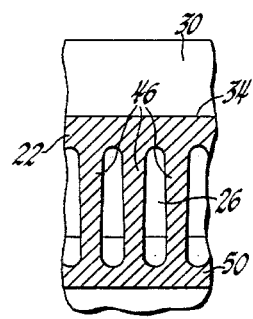
Figure 7:
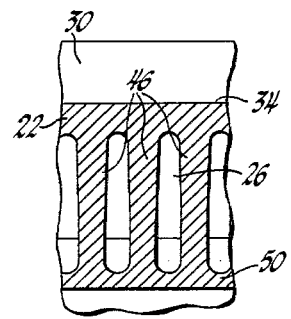

The longitudinally opposite ends of the struts 46 are preferably joined to the bowl of the piston head and to the thrust collar by fillets forming semicircular stress relieving arches extending between adjacent struts. As best seen in FIGURES 5–7, these arch forming fillets cooperate with their respective struts to substantially increase the structural rigidity and strength of the combustion chamber bowl and piston thrust collar. They further increase the initial heat flow path downwardly through the struts 46 and limit direct cooling oil contact with the relatively hot undersurface of the combustion chamber defining bowl.

The shape, number and close angular spacing of the several longitudinal vanes or struts 46 tend to increase the flow velocities initially induced in the supplied cooling oil in passing to and from the cored rims of the piston during engine operation. In passing through the relatively narrow arched upper portions of the several strut formed passages, the induced oil velocity and agitation tend to scrub and otherwise prevent any accumulation of heat insulating, heat induced deposits of cooling oil residue or varnish on the passage defined undersurfaces of the piston bowl.

In the illustrative piston, the lower ends of the longitudinal thrust load transmitting struts or vanes 46 are substantially equal in radial dimension to the transverse radial width of piston thrust collar 50 formed integrally and normally thereto. At their upper ends, these vanes or struts are flared radially inwardly on a radius and tangentially intersect the bottom wall of the piston bowl as indicated at 46' outwardly of the central depending boss. The diametrically opposite struts thus cooperate with the toroidal bowl of the piston head to form a plurality of equiangularly spaced load transmitting arches extending diametrically of the piston and intersecting coaxially of the piston head. The several struts 46 are also flared radially outwardly on a shallow radius adjacent their upper ends and tangentially interesect the arcuately formed side wall of the piston head bowl as indicated at 46'' in FIGURES 1 and 3. The arcuate side wall of the bowl is thus structurally supported for combustive thrust load transmission through approximately half its vertical height. The outwardly flared upper ends of the several struts also act through the upper portion of the bowl side wall to structurally support the upper peripheral rim.

The radially extending, arch forming struts of the illustrative pistons thus cooperate to adequately support the combustion chamber defining bowl of the piston head. These struts or vanes further provide ample conductive heat flow paths away from the combustion chamber bowl and rim of the head. During engine operation, the tapered surface areas of these struts normally cooperate with the cooling oil being continuously supplied to the chamber 26 to assure adequate equalized cooling of the piston under all engine operating conditions. The supplied cooling oil is normally drained from the piston and carrier formed chamber through one or more overflow drain ports 72 provided in the skirt of the piston carrier laterally of the pin mounting bore extending therethrough. During nominally unloaded portions of the piston operating cycle, the outer piston member is free to rotate relative to its mounting carrier and cylinder. Such rotation tends to equalize wear of the slidably engaged surfaces of the several engine members.

The slightly modified pistons illustrated in FIGURES 8–10 and 11–13 are substantially the same as the previous embodiment except for minor changes affecting the cored rim and the combustion chamber defining bowl. Hence, these alternative piston structures need not be fully shown and described. Corresponding components of these modified embodiments are thus identified by the same reference numerals previously applied in describing the structure of the first embodiment.

Figure 8:
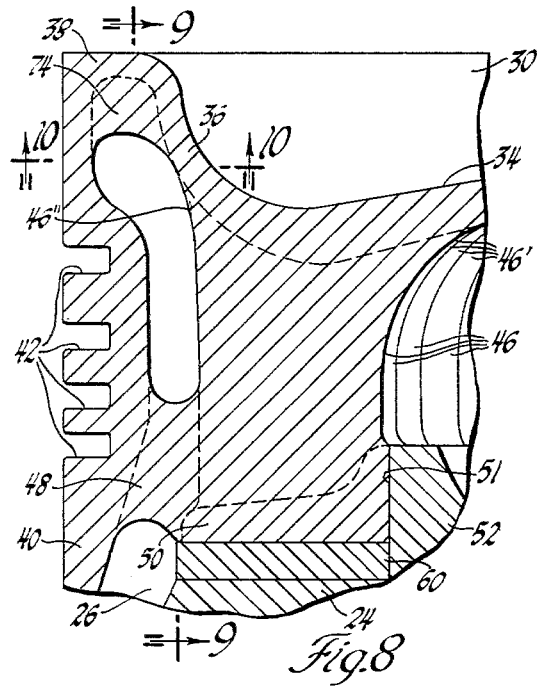
FIGURE 8 is an enlarged sectional view similar to a portion of FIGURE 1 and shows a slightly modified form of the invention having a plurality of radial ribs intersecting the cored rim of the piston.
Figure 9:
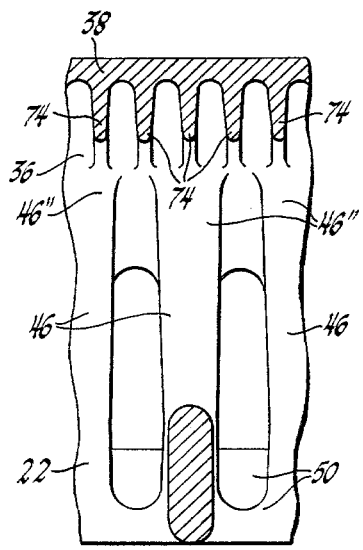
FIGURE 9 is a fragmentary sectional view taken substantially in the plane indicated by the line 9—9 in FIGURE 8.
Figure 10:
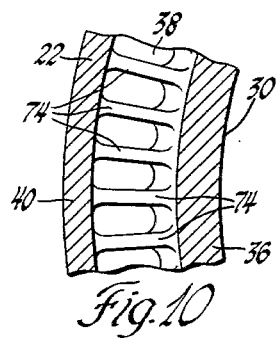
FIGURE 10 is a sectional view further illustrating the radially ribbed rim of the modified piston and is taken substantially in the plane indicated at 10—10 of FIGURE 8.

In the form of the invention shown in FIGURES 8–10, the cored rim 38 of the piston member 22 is intersected by a plurality of equiangularly and closely spaced, depending ribs 74 extending radially between the upper end of the bowl side wall 36 and adjacent upper end of the piston skirt 40. These ribs are preferably tapered downwardly as shown in FIGURE 9 and structurally reinforce the peripheral rim of the piston. The substantial surface provided by these ribs and their close radial spacing cooperate with the supplied cooling oil to assure adequate cooling of the piston rim and to prevent heat insulating oil varnish deposits on the interior surface of the rim.

In the modified piston illustrated in FIGURES 11–13, the side wall 36 of the combustion chamber bowl 32 is provided with two rows of equiangularly spaced, vertically staggered spines 76 and 78 projecting radially outwardly into the cored rim portion of the piston. These relatively short spines provide additional rim cooling surface area and agitate cooling oil moving within the cored rim. Adequate cooling of the rim is thus assured. The scrubbing turbulence provided by the spines further cooperates with the reduced interior rim temperatures obtained to prevent any formation or depositing of heat insulating oil varnish on the interior rim surface.

The combustion chamber bowl of the modified piston shown in FIGURES 11–13 is also provided with an annular boss 80 depending from the bowl bottom wall concentrically of the depending central boss 35 and radially adjacent the inwardly curved, bowl intersecting upper ends of the several load and heat transmitting struts 46. The annular boss 80 thus cooperates with the central boss 35 to reinforce the bowl bottom wall centrally of the several struts and substantially increases the bowl undersurface and conductive heat transfer to the piston cooling oil. During piston reciprocation, a substantial portion of the relative cool oil supplied to the opposing recess formed in the upper journal boss of the carrier is deflected radially outwardly of the piston by the annular boss 80. This outwardly deflected oil passes through the several strut defined passages and into the hollow peripheral rim of the piston thus assuring adequate equalized heat transfer from the bowl undersurface, the bowl supporting struts and the rim of the piston.

The equalized cooling and structural rigidity provided in the several illustrative pistons by the bowl supporting struts and by the rim intersecting ribs 74 or spines 76 and 78 cooperate to prevent any build-up of heat insulating undercrown oil varnish deposits. The various problems often experienced with similar prior art pistons due to excessive thermal operating conditions are thus avoided. As indicated above, such heat induced problems include burning and radial side wall cracking of the combustion chamber bowl; circumferential cracking of the cored piston rim; thermal growth and cracking of the bowl and collar supporting struts; and piston ring and cylinder scuffing resulting from ring fouling heat seizures and from excessive thermal growth of the piston head and the adjacent upper ring mounting portion of the piston skirt.

It should be further noted that the arcuately formed conical or spherical taper A provided immediately above the pivotal axis of the connecting rod attached pin 66 provides a rotatable side thrust bearing surface relative to the piston mounting cylinder of the associated engine. This spherical taper cooperates with the straight-line taper B normally provided above the lower compression ring groove to equalize cylinder and piston wear and acts to eliminate any scuffing therebetween. This intermediate arcuately formed outer surface taper also cooperates with the tapered wall thickness below the upper ring belt to more nearly conform radial expansion of the piston skirt to the temperature gradient actually experienced longitudinally thereof under normal engine operating conditions.

From the foregoing description of several illustrative embodiments, it will be apparent to those skilled in the art that the invention provides a substantially improved piston structure of the type disclosed and is fully capable of accomplishing the several objects and advantages enumerated above. It will be further apparent that various changes and departures might be made in and from the disclosed embodiments without departing from the spirit and scope of the invention as defined in the following claims.

We claim:

1. In a piston for a two-cycle internal combustion engine, a hollow piston member including a closed head end portion centrally recessed to form a combustion chamber bowl outwardly embraced by a hollow rim portion, a cylindrical skirt portion extending longitudinally from said rim portion, an annular thrust collar portion spaced concentrically and intermediate the ends of the skirt portion and coaxially of the head portion, said annular thrust portion being structurally connected to the central bowl portion of the piston head by a first plurality of relatively thin equiangularly and closely spaced load transmitting and heat conducting struts of wedge-shaped section spaced radially inwardly of the piston skirt portion and extending longitudinally and radially between the annular thrust portion and the recessed central bowl of the piston head, the lower ends of said first struts being substantially equal in radial dimension and integrally connected to the annular thrust collar portion and the upper ends of said first struts being rounded to form a plurality load bearing and heat conducting arches tangentially including the bowl forming wall portion of the piston head, and a second plurality of equiangularly spaced struts radially connecting the annular thrust collar portion to the outwardly adjacent skirt portion of the piston, and said piston member defining a coolant receiving chamber outwardly embraced by the piston skirt portion and extending between the thrust collar portion and the head end of the piston member.

2. In a piston as set forth in claim 1, the hollow combustion chamber defining peripheral rim of the piston head having a plurality of equiangularly and closely spaced ribs extending radially between the upper end of the combustion chamber defining bowl and the upper end of the piston skirt portion connected thereto.

3. In a piston as set forth in claim 1, said piston head having a plurality of equiangularly and closely spaced and longitudinally staggered spines formed integrally of the upper side wall of the combustion chamber defining bowl and projecting radially outwardly into the hollow rim portion of the head.

4. In a hollow piston as set forth in cliam 1, said thrust collar portion defining a cylindrical journal surface coaxially of the piston member, and an annular thrust bearing surface extending radially therefrom, said piston skirt having an inwardly facing cylindrical journal surface formed adjacent its open end in longitudinally spaced concentric relation to the journal surface of the thrust transmitting portion, a piston carrier rotatably mounted within the longitudinally spaced journal surfaces of the hollow piston member and having a radially extending shoulder thereon rotatably engageable with the thrust bearing surface of the piston member, and bearing means extending transversely of the piston carrier and adapted to pivotally connect the piston to a connecting rod for piston reciprocating movement.

5. In a piston as set forth in claim 4, the pivotal axis of said bearing means intersecting said piston in a transverse plane spaced below the thrust collar portion and substantially bisecting the skirt length of the piston, and said piston skirt being outwardly finished to provide a constant radius cylindrical surface below said plane, an intermediate arcuately formed taper extending tangentially between the lower cylindrical surface and a straight-line frusto-conical taper formed adjacent the head end of the piston.

6. In a piston as set forth in claim 1, bearing means associated with said annular thrust portion and adapted to pivotally connect the piston member to a connecting rod for piston reciprocating movement about a pivotal axis intersecting said piston in a transverse plane substantially bisecting the length of the piston, and said piston skirt being outwardly finished to provide a substantially constant radius surface below the transverse plane including the pivotal axis, an intermediate arcuate formed taper extending between said plane and a first ring mounting groove formed circumferentially of the skirt portion and having a tangential straight-line taper extending from said first ring mounting groove to the head end of said piston.

7. In a piston for a two-cycle internal combustion engine, a hollow piston member including a head portion centrally recessed to form a toroidal combustion chamber bowl portion outwardly embraced by a hollow rim portion, a cylindrical skirt portion extending longitudinally from said rim portion and having annular wall portions of increased thickness spaced longitudinally and adjacent opposite ends thereof, said annular wall portions each having a plurality of sealing ring mounting grooves formed circumferentially therein, an annular thrust transmitting portion spaced concentrically and intermediate the ends of the skirt portion and coaxially of the head portion, said annular thrust portion being structurally connected to the central bowl portion of the piston head by a first plurality of relatively thin equiangularly and closely spaced load transmitting and heat conducting struts of wedge-shaped transverse section spaced radially inwardly of the piston skirt portion and extending longitudinally and radially between the annular thrust portion and the central bowl portion of the piston head and forming narrow radial passages therebetween substantially equal in transverse width to the adjacent struts, the lower ends of said first struts being substantially equal in radial dimension and rounded to tangentially intersect the annular thrust portion integrally connected thereto and the upper ends of said first struts being rounded laterally and radially inwardly and outwardly to tangentially intersect the bottom and side walls of the central bowl portion of the piston head and cooperating therewith to form a plurality of load bearing and heat conducting arches, and a second plurality of equiangularly spaced struts rigidly connecting a number of said first struts and the annular thrust portion radially outwardly to the thicker ring groove defining wall portion of the skirt adjacent the head end of the piston, and means cooperating with said piston member and defining a cooling oil receiving chamber extending between said thrust collar portion and the head end of the piston member.

8. A hollow piston member for a two-cycle internal combustion engine comprising a head end portion centrally recessed to form an open semi-turbulent combustion chamber bowl having a conically formed bottom wall and upwardly and outwardly curved side wall embraced outwardly by a hollow rim, a cylindrical skirt portion extending longitudinally from the rim of said head end portion and having circumferentially grooved ring mounting portions of increased wall thickness spaced longitudinally adjacent the opposite ends thereof, an annular thrust collar portion supported concentrically of the skirt portion and coaxially of the head end portion by a first plurality of relatively thin equiangularly and closely spaced load transmitting and heat conducting struts spaced radially inwardly of the skirt portion and extending longitudinally and radially between the annular thrust collar portion and the bowl forming portion of the piston head, said first struts having radially extending side walls forming narrow radially extending passages therebetween substantially equal in transverse width to the adjacent struts, said struts being integrally and radially connected at their lower ends to the annular thrust collar portion and being rounded radially inwardly and outwardly at their upper ends to tangentially intersect the bottom and side walls of the bowl forming portion of the piston head and integrally connected thereto and cooperating with diametrically opposite struts to form a plurality of diametrical load bearing and heat conducting arches, and a second plurality of equiangularly spaced struts radially connecting the annular thrust collar portion and an equispaced plurality of the first struts outwardly to the ring mounting wall portion of the skirt adjacent the rim end of the piston, and cooperating means defining an oil receiving chamber extending between the thrust collar portion and the recessed combustion chamber defining head end portion of the piston member.

9. In a piston as set forth in claim 8, the hollow peripheral rim of the piston head having a plurality of equiangularly and closely spaced depending ribs extending radially between the upper end of the combustion chamber defining bowl and the upper end of the piston skirt portion connected thereto.

10. In a piston as set forth in claim 8, the hollow rim of the piston head having a plurality of equiangularly spaced and longitudinally staggered spines formed integrally of the upper side wall radius of the combustion chamber defining bowl and projecting radially outwardly and downwardly into the hollow rim portion of said head.

11. In a piston as set forth in claim 8, bearing means associated with said annular thrust portion and adapted to pivotally connect the piston member to a connecting rod for piston reciprocating movement about a pivotal axis intersecting said piston in a transverse plane substantially bisecting the length of the piston, and said piston skirt being outwardly finished to provide an intermediate arcuately formed taper extending tangentially between a substantially constant radius cylindrical surface below the transverse plane including the pivotal bearing axis, and a first ring mounting groove formed circumferentially of the skirt portion and having a tangential straight-line frusto-conical taper extending from said first ring mounting groove to the head end of said piston.

12. In a hollow piston as set forth in claim 8, said thrust collar portion defining a cylindrical journal surface coaxially of the piston member and an annular thrust bearing surface extending radially therefrom, said piston skirt having an inwardly facing cylindrical journal surface formed adjacent its open end in longitudinally spaced concentric relation to the journal surface of the thrust transmitting portion, a piston carrier rotatably mounted within the longitudinally spaced journal surfaces of the hollow piston member and having a radially extending shoulder thereon rotatably engageable with the thrust bearing surface of the piston member, bearing means extending transversely of the piston carrier and adapted to pivotally connect the piston to a connecting rod for piston reciprocating movement, and said piston skirt being outwardly finished to provide an intermediate arcuately formed taper spaced outwardly of said thrust portion and extending tangentially between a constant radius cylindrical surface formed below the pivotal axis of said bearing means, and a straight-line frusto-conical taper extending tangentially therefrom to the head end of the piston.

13. In a piston as set forth in claim 12, the hollow rim of the piston head having a plurality of equiangularly spaced depending vanes formed integrally of the upper side wall radius of the combustion chamber defining bowl and projecting radially outwardly and downwardly into the hollow rim portion of the piston.

14. In a piston for an internal combustion engine, a hollow piston member closed at one end and forming a movable end wall of an expansible combustion chamber, a cylindrical skirt portion extending longitudinally from the closed combustion chamber end wall, an internal thrust transmitting portion longitudinally spaced from the closed end wall of the piston and structurally connected thereto by a plurality of relatively thin equiangularly and closely spaced load transmitting and heat conducting struts spaced radially inwardly of the skirt portion and extending longitudinally and radially between the internal thrust portion and the closed end wall of the piston and forming relatively narrow radially extending passages therebetween, and said struts being rounded at their upper ends to intersect the closed end wall of the piston tangentially and integrally connected therewith to form a plurality of load bearing and heat conducting arches extending longitudinally and diametrically of the piston member.

15. A hollow piston for an internal combustion engine including a closed end forming a movable end wall of an expansible combustion chamber, a cylindrical skirt portion extending longitudinally from the closed combustion chamber end wall, and an internal thrust transmitting portion spaced intermediate the ends of the skirt portion and structurally connected to the closed end wall of the piston by a plurality of relatively thin equiangularly and closely spaced load transmitting and heat conducting struts of wedge-shaped transverse section spaced radially inwardly of the skirt portion and extending longitudinally and radially between the internal thrust portion and the closed end wall of the piston and forming narrow radially extending passages therebetween substantially equal in transverse width to the adjacent struts.

16. In a hollow piston as set forth in claim 15, said thrust transmitting portion defining a cylindrical journal surface and an annular thrust bearing surface coaxially of the piston member, said piston skirt having an inwardly facing cylindrical journal surface formed adjacent its open end in longitudinally spaced concentric relation to the journal surface of the thrust transmitting portion, a piston carrier rotatably mounted within the longitudinally spaced journal surfaces of the hollow piston member and having a radially extending shoulder thereon rotatably engageable with the thrust bearing surface of the piston member, and bearing means extending transversely of the piston carrier and adapted to pivotally connect the piston to a connecting rod for piston reciprocating movement.

17. In a piston as set forth in claim 16, the pivotal axis of said bearing means intersecting said piston in a transverse plane substantially bisecting the length of the piston and said piston skirt being outwardly finished to provide a constant radius cylindrical surface below said plane, an intermediate arcuately formed taper extending above said plane and tangential to a straight-line frusto-conical taper formed adjacent the head end of the piston.

18. In a piston as set forth in claim 15, bearing means associated with said annular thrust portion and adapted to pivotally connect the piston member to a connecting rod for piston reciprocating movement about a pivotal axis intersecting said piston in a transverse plane substantially bisecting the length of the piston, and said piston skirt being outwardly finished to provide a substantially constant radius surface below the transverse plane including the pivotal axis, an intermediate arcuately formed taper extending between said plane and a first ring mounting groove formed circumferentially of the skirt portion and having a tangential straight-line taper extending from said first ring mounting groove to the head end of said piston.

19. A two-piece floating piston for an internal combustion engine including a hollow piston member closed at one end and forming a movable end wall of an expansible combustion chamber, a cylindrical skirt portion extending longitudinally from the closed end wall, and an internal thrust transmitting portion supported intermediate the ends of the skirt portion, a piston carrier rotatably supporting the hollow piston member in thrust transmitting engagement with the internal thrust portion of the piston member, bearing means extending transversely of said carrier and adapted to pivotally connect the piston to a connecting rod for piston reciprocating movement, and said piston skirt being outwardly finished to provide an intermediate arcuately formed taper extending tangentially between a constant radius cylindrical surface below said pivot and a straight-line frusto-conical taper formed adjacent the head end of the piston.

20. In a floating piston assembly for an internal combustion engine, a hollow piston member having one end closed and forming a movable end wall of an expansible combustion chamber, a cylindrical skirt portion extending longitudinally from the closed combustion chamber end wall, and an annular thrust transmitting portion spaced longitudinally and structurally connected to the closed end wall of the piston by a plurality of relatively thin equiangularly and closely spaced load transmitting and heat conducting struts spaced radially inwardly of the skirt portion and extending longitudinally and radially between the thrust portion and the closed end wall of the piston, said thrust transmitting portion defining a cylindrical journal surface and an annular thrust bearing surface coaxially of the piston member, said piston skirt forming a second cylindrical journal surface adjacent its open end, a piston carrier rotatably mounted within the spaced journal surfaces of the hollow piston member and rotatably supporting the piston in thrust bearing surface engagement with the annular thrust bearing surface of the piston member, and bearing means extending transversely of the piston carrier and adapted to pivotally connect the piston to a connecting rod for piston reciprocating movement about a transverse axis substantially bisecting the length of the piston, and said piston skirt being outwardly finished to provide a constant radius cylindrical surface below said axis, an intermediate arcuately formed taper extending above said axis and a tangential straight-line frusto-conical taper formed adjacent the head end of the piston.

References Cited by the Examiner
UNITED STATES PATENTS

| | | | |
|---|---|---|---|
| 2,304,891 | 12/1942 | Dickson | 123—41.35 |
| 2,865,348 | 12/1958 | Kraemer | 123—41.35 |
| 3,053,595 | 9/1962 | Dilworth | 123—41.35 |

KARL J. ALBRECHT, *Primary Examiner.*